United States Patent [19]
Schulz

[11] Patent Number: 6,022,132
[45] Date of Patent: Feb. 8, 2000

[54] METHOD AND APPARATUS FOR PROGRAMMING A CNC MACHINE WITH A PROBE

[75] Inventor: Todd W. Schulz, Santa Claus, Ind.

[73] Assignee: Thermwood Corporation, Dale, Ind.

[21] Appl. No.: 08/749,822

[22] Filed: Nov. 15, 1996

[51] Int. Cl.[7] .............................. G06F 19/00; G06G 7/64; G06G 7/66

[52] U.S. Cl. ................................ 364/474.28; 364/474.01; 364/474.11; 364/468.24; 318/572; 318/569

[58] Field of Search .............................. 364/191, 744.22, 364/468.01, 468.24, 474.01, 474.03, 474.17, 424.18, 400, 188–193, 474.28, 474.37, 550, 551.01, 551.02; 318/572, 569, 567, 560, 568.1

[56] References Cited

U.S. PATENT DOCUMENTS

| | | | |
|---|---|---|---|
| 3,932,923 | 1/1976 | Dimatteo | 364/474.03 |
| 4,697,249 | 9/1987 | Kishi et al. | 364/900 |
| 4,791,575 | 12/1988 | Watts, Jr. et al. | 364/474.36 |
| 4,870,337 | 9/1989 | Matsuura | 364/474.03 |
| 4,922,431 | 5/1990 | Carter, II | 364/474.18 |
| 4,928,221 | 5/1990 | Belkhiter | 364/191 |
| 4,974,165 | 11/1990 | Locke et al. | 364/474.35 |
| 5,193,282 | 3/1993 | Aramaki et al. | 364/473.03 |
| 5,204,824 | 4/1993 | Fujimaki | 364/474.03 |
| 5,212,646 | 5/1993 | McMurtry | 364/474.03 |
| 5,291,393 | 3/1994 | Matsumoto et al. | 364/191 |
| 5,333,974 | 8/1994 | Matsuura | 409/84 |
| 5,334,918 | 8/1994 | McMurtry et al. | 318/568.16 |
| 5,357,450 | 10/1994 | Hemmerle et al. | 364/551.01 |
| 5,406,494 | 4/1995 | Schuett | 364/474.03 |
| 5,428,548 | 6/1995 | Pilborough et al. | 364/474.03 |
| 5,440,496 | 8/1995 | Andersson et al. | 364/474.03 |
| 5,583,409 | 12/1996 | Kurakake et al. | 318/569 |
| 5,604,677 | 2/1997 | Brien | 364/474.28 |
| 5,646,493 | 7/1997 | Hara et al. | 318/568.17 |
| 5,652,709 | 7/1997 | Andersson et al. | 364/474.03 |
| 5,808,888 | 9/1998 | Susnjara et al. | 364/191 |

*Primary Examiner*—Paul P. Gordon
*Assistant Examiner*—Ramesh Patel
*Attorney, Agent, or Firm*—Lalos & Keegan

[57] ABSTRACT

A method and apparatus for programming the motion of a machine tool in a three-dimensional machining space defined by an X, Y and Z coordinate system, the machine tool having a spindle linearly displaceable in three orthogonal X, Y and Z axes. A probe, mounted in the spindle and coupled to transducers, is moved by hand through a desired cutting path for an actual part. A computer connected to the transducers moves the machine in the direction that the probe is moved and/or rotates a workpiece mounted in the machining space and selectively records the position of the probe and workpiece to create an NC parts program that replicates the cutting path motions.

32 Claims, 2 Drawing Sheets

METHOD AND APPARATUS FOR PROGRAMMING A CNC MACHINE WITH A PROBE

BACKGROUND OF THE INVENTION

The present invention is related to numerical control (NC) and more particularly to computer numerical control (CNC). Numerical Control is the generic term applied to the automation of general purpose machine tools. Such automation is achieved through electronics and, utilizing computers, such automation has become more flexible and efficient.

A "three axis" machine is one that provides for linear motion along mutually orthogonal X, Y and Z axes of a fixed coordinate system. A "four axis" machine is one that provides for linear motion along mutually orthogonal X, Y and Z axes of a fixed coordinate system and also provides for rotation of a part (workpiece) about a rotary axis. One advantage of numerical control is the ability to accurately position the axes of a machine and control the cutting feeds and speeds for a machining pattern that can be repeated for each workpiece. This positioning and control information (the NC data) makes up an NC program or part program which is created by a tooling engineer (programmer). NC programs are stored in a memory of the CNC control system (hereinafter referred to generally as the controller) after the programs have been loaded into the memory through a punched tape, for example. In more sophisticated controllers, portions of the NC program can be created and loaded directly into the controller memory by "teaching" the machine with a hand held programmer. Once the NC program is written and stored in the controller, manual action is normally limited to setting up the part, starting the CNC controller which executes the program, and carrying out any necessary manual operations such as tool changes. The NC program, when executed by the controller directs the machine through a series of fabrication steps. For example, where the machine includes a cutting tool the cutting tool is directed relative to the workpiece to make a series of cuts (straight line or circular) in accordance with a series of NC program instructions. These instructions direct the tool as to where the workpiece is to be cut and in what order the cuts are to be made.

Most NC and CNC systems are programmed according to a standard of the Electronic Industries Association designated as EIA RS 274-D. The part program (or NC code making up the program) can be created through various methods, most of which are available to users of a commercial CNC system, namely the 91000 SuperControl, available from Thermwood Corporation, Dale, Indiana. The most direct method is for a programmer to write the code, line by line, on a personal computer (PC) using a text editor. This requires that the programmer have knowledge of all of the EIA codes, the required syntax and the ability to calculate positions and movements.

Another method available is a menu-driven system (commonly called conversational programming) in which the "programmer" simply responds to queries from the controller and fills in the blanks in a displayed "form". The controller then creates the NC code required to generate the motions defined by the programmer.

Another method of creating NC code for a part program is through use of a Computer Aided Design/Computer Aided Manufacturing (CAD/CAM) system. Using a CAD/CAM system, the programmer first defines the geometry of the part and then the cutting path. The system software then determines the motions of a particular machine required to produce the desired cut path and then generates the NC program code needed to effect the desired cut path on the particular machine. This system has certain disadvantages. CAD/CAM software capable of generating three or four axis NC programs is expensive and requires substantial training to operate. The program is generated with the assumption that the particular machine on which it will run is geometrically precise and accurate. Any inaccuracy in the actual machine or head results in an inaccurate cut path when the program is executed. Also, certain processes used to manufacture a part which is to be trimmed by the machine under program control may be at variance with the original part design used in creating the NC program. This is especially true for certain plastic processes, e.g. thermoforming, which heat the material for forming and then cool the material into the final shape. Part shrinkage during cooling may not be predictable so that the final part may not exactly match the CAD/CAM design. Thus, the trim path may be inaccurate.

Yet another method available on the SuperControl is through a Hand Held Programmer that is used to perform conversational programming. This method allows the programmer to get physically close to the machine and carefully observe positions and movements while generating the program. The actual machine is moved around the cutting path for an actual pre-trimmed part, defining program points at appropriate intervals. This method has the advantage of accounting for inaccuracies in the machine and variances between the actual part and its original design. While such system requires less training than the CAD/CAM or other programming methods, this method does require a level of technical training and occupies the machine during program development, which reduces its availability for production. On the Thermwood SuperControl, the Hand Held Programmer may be used to create a program consisting only of major points needed to define the cut path. These major points can then be loaded into the CAD/CAM system to create the final part program. This hybrid approach has the advantage of accounting for inaccuracies in the part and/or machine while providing the smooth and fast program attributes of the CAD/CAM system. A disadvantage is that the programmer must be skilled in both the Hand Held Programmer and the CAD/CAM system and substantial machine time is still required to program the major points.

SUMMARY OF THE INVENTION

The present invention provides a novel system for creating a parts program for linear movement of a machine tool within a three dimensional space defined by an X, Y and Z coordinate system and rotative movement of the workpiece about a rotary axis within such space. Such programs control the movements of a three or four axis machine and the cutting path of the machine can be programmed using the present invention with less training and utilizing less machine time than prior methods and apparatus.

The programming system of the present invention includes a probe that mounts in the head of the machine for which the program is being created. The probe has a shape and geometry that substantially corresponds to the cutting bit that will be used in the actual machining process. The probe is connected to a computer that is in turn connected to motors for driving the machine in the X, Y and Z directions and for rotating the workpiece or part about the rotary axis. The probe is pushed by hand in the direction of the desired cutting path. Transducers coupled to the probe convert the displacement of the probe into an electrical output representative of magnitude and direction of the probe displacement, i.e. a displacement vector. Such displacement vector is used by the computer to control the motors to drive the machine in the direction (X, Y or Z) in which the probe is pushed. Thus, if the probe is pushed in the X direction, the machine with head and probe attached will move in the X direction until the probe is no longer pushed. This provides a normal, intuitive feel to the probe. The computer will record the position of the probe at selected times under operator control to obtain selected points along the cutting path or will sample the position of the probe at very high speed (e.g. every 6 ms) to obtain a continuum of position points along the cutting path. These position points are stored in a file that can later be read (e.g. by a CAD/CAM system or the parts program system software of the controller) to create a part program in a conventional manner. The position of the probe within the space defined by the X, Y and Z coordinate system is obtained by the computer from incremental encoders on the drive motors. Initially, the machine will be placed in a "home" position within the movement space of the machine and the encoders are reset. As the machine moves from the "home" position, the computer can determine its movement from the incremental encoders and calculate its position in a conventional manner.

In order to generate a program for a cylindrical or axisymmetric part, the probe X-axis drive is disabled and a rotary drive is enabled. With the probe rotary drive enabled, pushing the probe in the X-direction (i.e. to the right or left) will cause the part to be rotated about its longitudinal axis in a clockwise or counterclockwise direction. The probe will remain vertical and in contact with the top surface of the part as it rotates in order to scan and record points on the outside circumference of the part.

Thus, the operator of the present invention can lead the machine through a desired cutting path along a part to be cut, pushing the probe in the cutting path direction and, if necessary, rotating the part while maintaining a vertical probe orientation while also recording the position of the probe and consequently the shape of the part. This accurate record of the cutting path can then be utilized by the controller to create a parts program. The present invention thus provides an alternative system for creating path position information that is easier to learn and operate than the prior CAD/CAM and Hand Held Programmer systems, is less expensive than the CAD/CAM system and requires less machine time than the Hand Held Programmer system.

DETAILED DESCRIPTION

Figure 1:
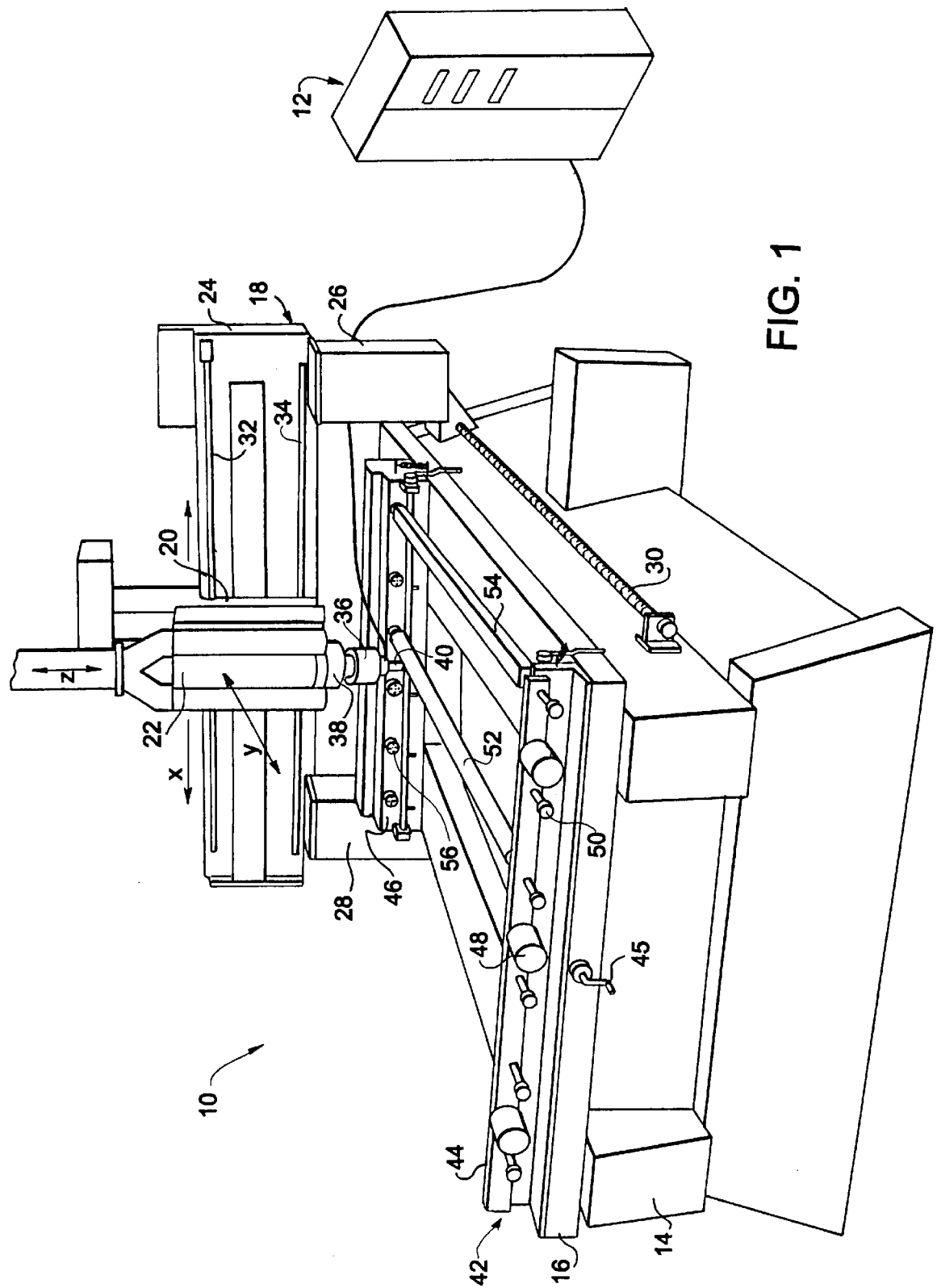
FIG. 1 is a perspective view of a CNC machine equipped with the parts programming components of the present invention.

FIG. 1 illustrates a CNC machine 10 connected to a controller 12 for displacing a tool of the machine in accordance with an NC parts program stored within the controller. The machine and the attached tool move within a three dimensional machine space defined by an X, Y and Z coordinate system. The machine 10 includes a base 14 and a stationary worktable 16. Machine 10 further includes a bridge or gantry 18 mounted on the base and displaceable longitudinally or along the Y-axis relative to base 14 and a toolhead support assembly 20 that is displaceable relative to gantry 18 in the transverse or X direction and a tool mounting assembly 22 mounted on the toolhead support assembly and displaceable vertically in the Z direction.

The gantry 18 includes a transversely disposed portion 24 and a pair of depending portions 26 and 28 that are supported and displaceable along a pair of parallel rails mounted on the base 14. The gantry 18 is displaced along the Y-axis by a pair of feedscrews 30, 30 supported on opposite sides of the base 14 cooperating with nut assemblies on depending portions 26 and 28 and driven by a Y-axis servo motor operated by controller 12. The transverse portion 24 of the gantry 18 is provided with a pair of spaced, parallel rails 32 and 34 on which toolhead support assembly 20 is supported and along which the support assembly is displaced. Transverse portion 24 further is provided with a feedscrew which cooperates with a nut assembly on the support assembly 20 for displacing the support assembly 20 along the X-axis, and which is driven by an X-axis servo motor operated by controller 12. Tool mounting assembly 22 similarly is supported and displaceable vertically in the Z-axis along a pair of transversely spaced guide rails. Tool mounting assembly 22 is also provided with a feedscrew which cooperates with a nut assembly on the toolhead support assembly 20 for displacing the tool mounting assembly vertically. Such feedscrew is driven by a Z-axis servo motor operated by controller 12.

The present invention includes a probe housing 36 mounted in the spindle of the toolhead 38 in place of the cutting tool that will be used with the machine to perform the cutting operation. The probe housing 36 is rigidly fixed so that it does not rotate. A probe 40 is mounted in the housing 36. The size and shape of the probe 40 is selected to match the size and shape of the cutting bit that will be used in the actual machining operation.

Machine 10 further includes a workpiece retaining assembly 42 that consists of a tailstock assembly 44 rigidly mounted on one end of worktable 16 and a headstock assembly 46 supported on worktable 16 and displaceable relative to tailstock assembly 44 along the Y-axis by means of a handcrank 45 that operates to rotate a feedscrew. The tailstock assembly 44 includes a plurality of transversely spaced pneumatic cylinder assemblies 48 and a plurality of transversely spaced workpiece support spindles 50. In order to load a workpiece, e.g. 52 (finished) or 54 (unfinished), onto the machine, a support spindle 50 is grasped by its handle and retracted against the biasing force of a coil spring. The workpiece is loaded in place and then the handle is released so that an end portion of the support spindle 50 engages the end face of the workpiece with a compressive force to hold the workpiece in position. To firmly engage and thus clamp the workpiece in an operative condition between the headstock and tailstock assemblies, air under pressure is supplied to the pneumatic cylinder assemblies 48 which cause the support spindles 50 to extend to their maximum position and firmly support the end of the workpiece.

The headstock assembly 46 includes a plurality of journaled support spindles 56 each of which is disposed in longitudinal alignment with a respective support spindle 50 of tailstock assembly 44. Journaled support spindles 56 are each driven by an electric indexing motor under operation of controller 12 to rotationally index the workpiece, e.g. 52, about its longitudinal axis when clamped in an operative position between the headstock and tailstock assemblies.

Figure 2:
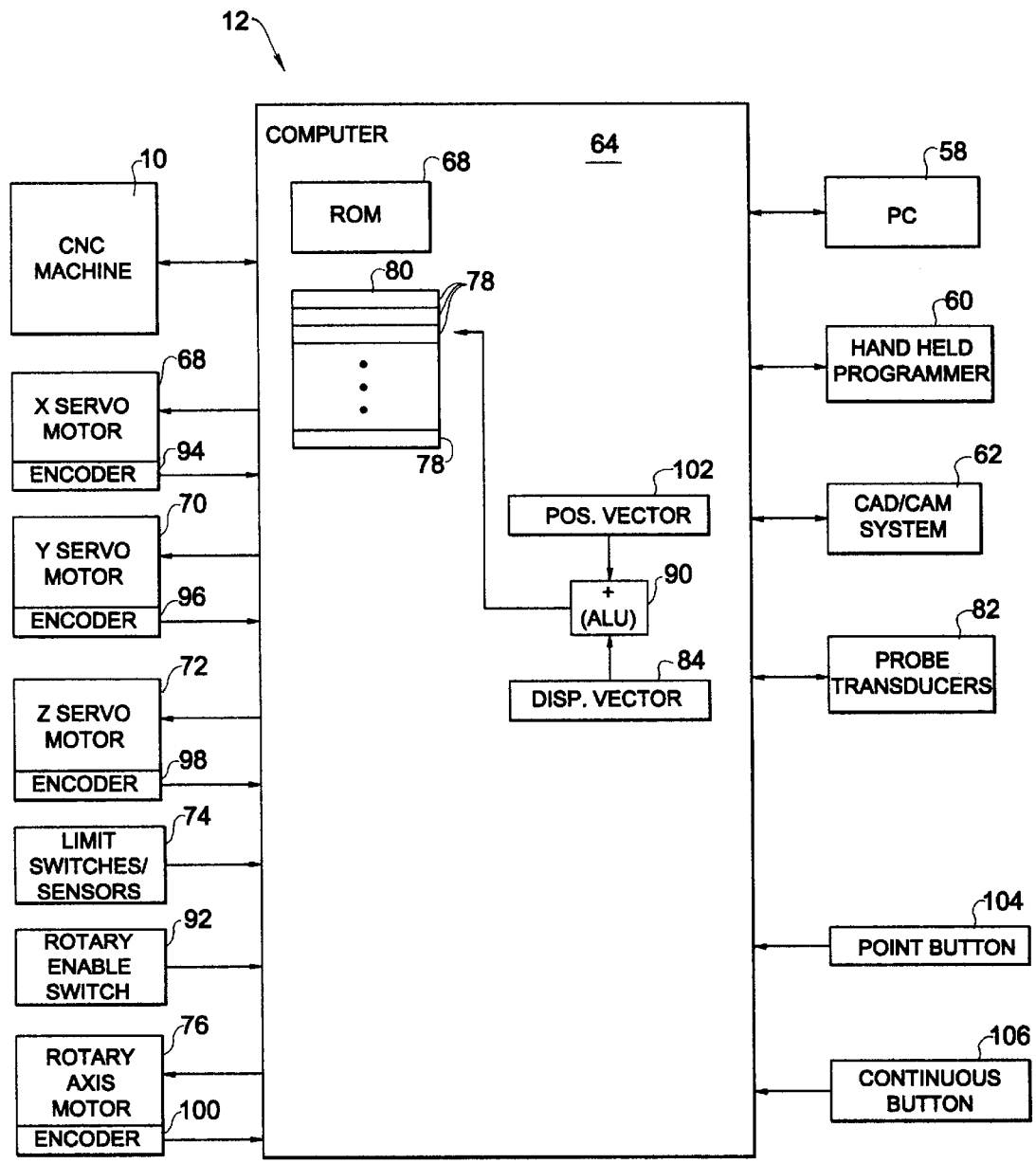
FIG. 2 is a schematic block diagram of the present invention.

FIG. 2 illustrates in block diagram form the major components of the present invention. Controller 12, e.g. the 91000 SuperControl, available from Thermwood Corporation, Dale, Ind. is programmed to create NC parts programs from cutting path information supplied to it. Controller 12 then uses this NC parts program to direct the CNC machine 10 through a series of fabrication steps. As previously discussed, the cutting path data can be created in a variety of ways including programming on personal computer (PC) 58, defining the path with the Hand Held Programmer 60, utilizing the CAD/CAM system 62, or a combination of such devices. The present invention provides a simpler and less expensive alternative.

In operation of the present invention, initially the CNC machine 10 is moved under control of computer 64 in controller 12 and system software in a Read Only Memory (ROM) 66, for example, to a "home position", i.e. a known position within the machining space defined by the X, Y and Z coordinate system. Computer 64 activates each of the X, Y and Z servo motors 68, 70 and 72, respectively to move CNC machine 10 along each of the X, Y and Z axes until limit switches or sensors 74 are tripped indicating the machine in the home position. Also, computer 64 activates the rotary axis indexing motor 76 to rotate the workpiece 52 to a home position, again defined by limit switches or sensors 74. With machine 10 in the home position, computer 64 resets all cutting path memory locations 78 that are stored in Random Access Memory (RAM) 80.

In order to define a desired cutting path for a part, an operator pushes probe 40 in the direction he wants the machine to move. This movement can be nonlinear. For example, the movement may be along a curved surface requiring the machine to traverse a path along two or three axes simultaneously. When probe 40 is pushed (or pulled) it is displaced within probe housing 36 and is mounted to allow movement of about 4500 microns in any direction from the housing centerline. The probe is mounted such that, when it is pushed or pulled, it is displaced within the probe housing but its longitudinal axis remains parallel to the longitudinal centerline of the probe housing and toolhead.

Probe transducers 82 coupled to the probe 40 convert the displacement of the probe into an electrical output representative of the magnitude and direction of the probe displacement, i.e. a displacement vector 84. Such displacement vector is fed to computer 64 which utilizes it for two purposes. First, the displacement vector is broken down into its X, Y and Z axis components, which components are used to control the X, Y and Z axis servo motors 68, 70 and 72 to move the machine 10 in the direction of the probe displacement. Thus, if the probe is pushed in the X direction, the machine 10 is moved in the X direction until the probe is no longer displaced off center. The further the probe is pushed within the probe housing (i.e. the greater the magnitude of deflection or displacement off center) the faster the motor(s) move. Computer software and programs for providing basic analysis and control as described herein with respect to computer 64 are well known in the art and a detailed discussion is not necessary for an understanding or appreciation of the present invention.

In the present invention, when used with a four axis machine and when used to program the cutting path for a cylindrical or axisymmetric part, e.g. workpiece 52, the probe is moved over the part such that it is vertically aligned with the longitudinal axis of the workpiece and perpendicular to the horizontal plane in which the longitudinal axis lies, as shown in FIG. 1. The operator then activates rotary-enable switch 92. This causes computer 12 to operate rotary axis motor 76 instead of X-axis servo motor 68 in response to displacement of probe 40 within its housing in the X direction. Therefore, if the probe is pushed in the X direction, i.e. to the left or right, the machine remains in vertical alignment with the workpiece but the workpiece is rotated clockwise or counterclockwise by an amount commensurate with the probe displacement. This permits the machine path around the circumference of a round or axisymmetric part to be defined.

As each of the servo motors 68, 70 and 72 move machine 10, incremental encoders 94, 96 and 98 indicate how far from the home position the machine has moved in each of the X, Y and Z directions. The computer 64, connected to each encoder, then calculates the exact position of the machine in the X, Y, Z machining space from the increment count received from each encoder. Similarly, the rotative orientation of the workpiece is derived from encoders 100 associated with the rotary axis motor 76. Thus, the encoders 94, 96, 98 and 100 indicate the position of the machine, toolhead and probe, and the workpiece within the machining space. This position is represented in computer 64 as a position vector 102. However, in order to obtain the exact position of the probe in recording the desired cutting path, the deflection or displacement offset of the probe from the toolhead/probe housing centerline must be accounted for. Computer 64 thus adds the displacement vector to the position vector before recording the sum in a path memory location 78. An arithmetic/logic unit (ALU) 90 can be used to perform this addition.

The operator selects one of two methods for recording position points along the cutting path as traversed by the probe 40. The first method is activated by pressing control button 104 (Point Button) which causes the computer 64 to record in path memory 80 the current position of the machine in each of the X, Y, and Z axes, corrected for probe deflection (displacement) and the rotative position of the workpiece. Thus, each time Point Button 104 is pressed, the current corrected position of the probe is recorded as well as the workpiece rotative position, and a sequence of such points is recorded to define the cutting path. The controller 12 will access the path memory 80 to create an NC part program that will consist of a series of linear motions whose end points correspond to the positions where the programming Point Button was pressed.

The second method for recording position points along the cutting path is activated by pressing control button 106 (Continuous Button) which causes the computer 64 to record in path memory 80 the current corrected position at a high sample rate, e.g. every 6 ms. Once the cutting path record is complete, the position data in memory 80 are processed to ensure that the resulting cutting motion, which was defined by hand movement of the probe, is smooth. The derivative of acceleration is limited for each axis to ensure such smooth motion. The recorded positions in memory 80 are converted by computer 64 into encoder counts/axis. At each recorded point, the vector sum of all axis encoder counts is calculated as the square root of $X^2+Y^2+Z^2+$ rotative axis position$^2$. This vector sum is compared to a predetermined value which if selected low enough for each particular application will ensure smooth axis motion. If the vector sum is greater than the predetermined value then the encoder counts/axis are converted back to axis position data and written into a location in the cutting path memory 80. If the vector sum is less than the predetermined value, the vector sum representing the next position point is added until the predetermined value is reached.

From the foregoing detailed description, it will be evident that there are a number of changes, adaptations and modifications of the present invention that come within the province of those having ordinary skill in the art to which the present invention pertains. However, it is intended that all such variations not departing from the spirit of the invention be considered as within the scope thereof as limited solely by the following claims.

We claim:

1. A device for programming the motion of a machine tool of a CNC machine in a three-dimensional machining space defined by an X, Y, and Z coordinate system, said machine tool having a spindle linearly displaceable in three orthogonal X, Y, and Z axes:
   a probe mounted in said spindle;
   a transducer coupled to said probe and responsive to a displacement force applied to said probe for generating a displacement vector representative of the magnitude and direction of said displacement force;
   a computer connected to said transducer for receiving said displacement vector;
   a first drive means connected to said computer and responsive to said computer for moving said machine tool along at least one of said X, Y and Z axes commensurate with said displacement vector;
   a second drive means connected to said computer and responsive to said computer for rotating a workpiece mounted for rotative movement in said machining space about a longitudinal axis of said workpiece commensurate with said displacement vector.

2. A device as in claim 1 further including:
   a position determining means for determining the position of said probe in said three-dimensional machining space;
   said computer being connected to said position determining means and including a memory for storing a vector representative of a position of said probe in said three-dimensional machining space as determined by said position determining means.

3. A device as in claim 2 further including a position sampling means connected to said computer for causing said computer to store a vector representative of a present position of said probe each time said position sampling means is actuated.

4. A device as in claim 3 further including:
   a rotative position determining means for determining the rotative position of said workpiece about said longitudinal axis;
   said computer being connected to said rotative position determining means for storing a representation of said workpiece rotative position in said memory each time said position sampling means is actuated.

5. A device as in claim 4 wherein said rotative position determining means includes encoders coupled to said second drive means.

6. A device as in claim 5 wherein said second drive means includes an electric motor.

7. A device as in claim 3 further including a probe housing for mounting said probe in said spindle and wherein said probe is mounted in said probe housing for lateral displacement therein and wherein said lateral displacement is represented by said displacement vector.

8. A device as in claim 7 wherein said computer includes means for adjusting said vector representative of a present position of said probe by said displacement vector.

9. A device as in claim 2 wherein said memory includes a plurality of storage locations for storing a plurality of position vectors representing a plurality of sequential positions of said probe.

10. A device as in claim 2 further including a position sampling means connected to said computer for causing said computer to store a plurality of vectors representing a plurality of sequential positions of said probe.

11. A device as in claim 2 wherein said position determining means includes encoders coupled to said first drive means.

12. A device as in claim 11 wherein said first drive means includes servo motors.

13. A device as in claim 1 wherein said machine tool includes a means for securing said workpiece in an operative position in said machining space.

14. A device as in claim 13 wherein said second drive means includes an electric motor for rotating said workpiece securing means.

15. A method of programming the motion of a machine tool in a three-dimensional machining space defined by an X, Y, and Z coordinate system, said machine tool having a spindle linearly displaceable in three orthogonal X, Y, and Z axes comprising:
   mounting a probe in said spindle;
   coupling a transducer to said probe;
   applying a displacement force to said probe for generating a displacement vector representative of the magnitude and direction of said displacement force;
   receiving said displacement vector in a computer;
   moving said machine tool along at least one of said X, Y and Z axes commensurate with said displacement vector under control of said computer; and
   rotating a workpiece mounted for rotative movement in said machining space about a longitudinal axis of said workpiece commensurate with said displacement vector under control of said computer.

16. A method as in claim 15 further including determining the position of said probe in said three-dimensional machining space and storing a vector representative of a position of said probe.

17. A method as in claim 16 wherein said step of determining the position of said probe includes the steps of determining an inexact position of said probe from position encoders and then adjusting said inexact position by said displacement vector to determine an exact position of said probe before storing a vector representation of said probe position.

18. A method as in claim 17 including storing a plurality of vector representations of a sequence of probe positions to represent a path of movement of said probe.

19. A method as in claim 16 including the steps of:
   determining the rotative position of said workpiece;
   and storing a representation of said rotative position with said stored vector representation of said probe position in said three-dimensional machining space.

20. A method as in claim 19 further including actuating a position sampling means to cause said vector representation of a probe position and said representation of said workpiece rotative position to be stored at a selected time.

21. A method as in claim 19 further including actuating a position sampling means to cause a continuum of vector representations of probe positions and workpiece rotative positions to be stored for a selected period.

22. A system of programming a controller of a machine, the controller having a processor and a memory, comprising:
   a transducer being mounted on a spindle of the machine;
   wherein the transducer upon receiving a force pushing toward a direction provides a corresponding signal to the controller for storage and for controlling the spindle to move along the direction.

23. The system of claim 22, wherein the force being exerted by an operator to a probe connected to the transducer.

24. The system of claim 22, wherein the controller being configured to continuously track a position of the transducer.

25. The system of claim 24, wherein the position being communicated by one of a X-axis encoder, a Y-axis encoder and a Z-axis encoder respectively connected to a X-axis assembly, a Y-axis assembly and a Z-axis assembly.

26. The system of claim 22, wherein the controller is configured to continuously track a radial position of a workpiece mounted on a workpiece support spindle connected to a rotary-axis motor.

27. The system of claim 26, wherein the radial position being communicated by a rotary encoder connected to one of the workpiece support spindle and the rotary-axis motor.

28. The system of claim 22, wherein the controller retrieves the stored signal and controls the spindle to move in accordance to the stored signal.

29. A system of programming a controller of a machine, comprising:

a transducer mount on a spindle of the machine;

wherein the transducer upon receiving a force provides a signal to the controller for storage and for controlling the spindle to move in accordance to the signal.

30. A method of programming a controller of a machine, the controller having a processor and a memory, comprising the steps of:

mounting a transducer on a spindle of the machine;

applying a force pushing the transducer toward a direction;

providing a signal representative of the force and the direction to the controller;

translating the signal into a program;

storing the program in the memory; and controlling the spindle to move toward the direction.

31. The method of claim 30, further comprising a step of: retrieving the program from the memory.

32. The method of claim 31, further comprising a step of: controlling the spindle to move in accordance to the program.

* * * * *